(12) United States Patent
Mourra et al.

(10) Patent No.: US 7,873,625 B2
(45) Date of Patent: Jan. 18, 2011

(54) FILE INDEXING FRAMEWORK AND SYMBOLIC NAME MAINTENANCE FRAMEWORK

(75) Inventors: John Mourra, Toronto (CA); Vladimir Klicnik, Oshawa (CA); Lok Tin Loi, Toronto (CA); Hiroshi Tsuji, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 11/532,804

(22) Filed: Sep. 18, 2006

(65) Prior Publication Data

US 2008/0071805 A1 Mar. 20, 2008

(51) Int. Cl.
*G06F 7/00* (2006.01)
*G06F 17/30* (2006.01)

(52) U.S. Cl. .................................. 707/711; 707/741
(58) Field of Classification Search ........................ None
See application file for complete search history.

(56) References Cited

U.S. PATENT DOCUMENTS

| | | | | |
|---|---|---|---|---|
| 4,893,232 | A | * | 1/1990 | Shimaoka et al. ............... 707/1 |
| 5,481,683 | A | | 1/1996 | Karim |
| 5,787,435 | A | * | 7/1998 | Burrows ..................... 707/102 |
| 5,806,058 | A | * | 9/1998 | Mori et al. ..................... 707/2 |
| 5,933,820 | A | * | 8/1999 | Beier et al. ..................... 707/1 |
| 6,366,956 | B1 | | 4/2002 | Krishnan |
| 6,460,178 | B1 | | 10/2002 | Chan et al. |
| 6,640,225 | B1 | * | 10/2003 | Takishita et al. ............... 707/5 |
| 6,654,758 | B1 | | 11/2003 | Teague |
| 6,741,988 | B1 | | 5/2004 | Wakefield et al. |
| 6,760,694 | B2 | | 7/2004 | Al-Kazily et al. |

(Continued)

FOREIGN PATENT DOCUMENTS

EP 0405829 1/1999

OTHER PUBLICATIONS

Kendrick et al., "Method for Supporting Non-Text Objects in an Index Structure that Originally Supported Only Text Records", Technical Disclosure Bulletin Jan. 1988, pp. 155-162.

(Continued)

*Primary Examiner*—Pierre M Vital
*Assistant Examiner*—Augustine Obisesan
(74) *Attorney, Agent, or Firm*—Scott D. Paul, Esq.; Carey Rodrigues Greenberg & Paul LLP (57) ABSTRACT

The present invention provides a file management system that includes a file indexing framework that allows third parties to contribute index handlers that are responsible for populating index entries for the artifacts they own and/or generate. The framework manages the creation, maintenance, and update of the index, and calls the index handlers at appropriate times so they can parse files that they understand for values that need to be stored in the index. The framework also provides APIs for querying the standardized fields of the index, so applications can search for standard types of data contributed for any of the indexed files. The present invention also provides a mechanism to keep track of symbolic name associations for every file/entity in the system. Specifically, the present invention provides a session-based and transient shadow table of symbolic names previously used by the files (even beyond the lifetime of the files themselves).

19 Claims, 3 Drawing Sheets

U.S. PATENT DOCUMENTS

| | | | |
|---|---|---|---|
| 7,783,615 B1* | 8/2010 | Compton et al. | 707/694 |
| 2003/0101171 A1* | 5/2003 | Miyamoto et al. | 707/3 |
| 2003/0144990 A1* | 7/2003 | Benelisha et al. | 707/1 |
| 2003/0182297 A1* | 9/2003 | Murakami et al. | 707/100 |
| 2004/0117362 A1 | 6/2004 | Nunez | |
| 2004/0220919 A1* | 11/2004 | Kobayashi | 707/3 |
| 2004/0225865 A1 | 11/2004 | Cox et al. | |
| 2005/0010452 A1 | 1/2005 | Lusen | |
| 2005/0050537 A1 | 3/2005 | Thompson et al. | |
| 2005/0086269 A1 | 4/2005 | Chen et al. | |
| 2005/0097452 A1* | 5/2005 | Eross | 715/513 |
| 2005/0203957 A1 | 9/2005 | Wang et al. | |
| 2006/0041606 A1* | 2/2006 | Sawdon | 707/205 |
| 2006/0112141 A1 | 5/2006 | Morris | |
| 2006/0136391 A1 | 6/2006 | Morris | |
| 2006/0206535 A1* | 9/2006 | Ogawa et al. | 707/200 |
| 2007/0016546 A1* | 1/2007 | De Vorchik et al. | 707/1 |

OTHER PUBLICATIONS

Harold Henke, "Methodology for Searching Adobe Acrobat Portable Data Format Files Based on Content Relevance", Research Disclosure No. 432, Article 141, p. 756, Apr. 2000.

Hedgemon et al., "Two-Level Index Conversion of Text to Composite Document", Technical Disclosure Bulletin Aug. 1987, pp. 990-993.

\* cited by examiner

FILE INDEXING FRAMEWORK AND SYMBOLIC NAME MAINTENANCE FRAMEWORK

BACKGROUND OF THE INVENTION

1. Field of the Invention

In general, the present invention relates to file management. Specifically, the present invention provides a system for indexing files and for tracking symbolic names associated with files.

2. Related Art

Many computer applications persist information by storing data in files. For example, a software tool that allows a user to create different kinds of data objects may store representations of each into a separate file. However, an application trying to find specific information that has been stored in one or more files faces two problems: (1) searching for data in files becomes time-consuming as the number and size of files increases; and (2) only files with well-known formats can be searched. The first problem can be addressed for the most part by indexing the contents of files: parsing each file once to store the relevant contents of the file into an index, and afterwards searching the index (which presumably provides efficient search characteristics) instead of each file individually. However, this technique also can only be used for files with well-known formats. Without a well-known format, the contents of a file cannot be parsed. A significant hurdle thus faces applications that wish to search or index arbitrary files with arbitrary formats. A trend in software is to support pluggable extensions, which allows clients to provide their own specialized behavior to the software. This trend leads to the use of file formats understood only by a specific extension, or the introduction of extensions-specific data into extensible file formats. Unfortunately, none of the existing systems are capable of treating extensions-specific data on par with file data it is hard-coded to understand.

Additional problems exist in the current art with respect to symbolic names for files. Specifically, consider an interdependent environment, where references are symbolic and not direct, examples of which may include an XML-based system. In such an environment, references between entities are described through symbolic names, where one entity references a symbolic name while another entity associates itself with the same symbolic name. At runtime, the referenced symbolic name is resolved to the respective entity. The advantages of such an environment are clear and documented, ranging from flexibility to pluggability. Nonetheless, one common problem encountered in such a system is the issue of dangling references, where a reference is un-resolvable due to a missing dependency. This may occur when an entity being referenced symbolically is deleted or its associated symbolic name is modified. When the entity being referenced is deleted, its association with the symbolic name is deleted with it. Even if the change was simply a modification of the associated symbolic name, then the association with the original symbolic name is deleted. Accordingly, the referencing entity is no longer capable of associating its dangling reference with the specific entity that was deleted. This means that there is no way to identify to a user of such an environment the reason that caused the dangling reference (e.g. the name of the specific file that was deleted). Looking at the same issue from a different perspective, it also means that when an entity's association with a symbolic name is deleted (i.e. the entity is either deleted or simply associated with a different symbolic name), there is no way to find all referencing entities that are affected after the fact (since they only reference the deleted symbolic name, and not the entity itself).

SUMMARY OF THE INVENTION

The invention introduces an indexing and search framework that allows third parties to contribute indexing extensions (referred to herein as index handlers) that are responsible for populating index entries for the artifacts they own and/or generate. Each entry in the index represents a file and its contents. The index entries include a standardized list of fields, such as file name and defined elements. These standardized fields allow similar data to be stored in a consistent way for each file, which therefore essentially allows file content searches (via searching of the index) to be done in a consistent way for all files, regardless of the format of those files. The framework manages the creation, maintenance, and update of the index, and calls the index handlers at appropriate times so they can parse files that they understand for values that need to be stored in the index. The framework provides APIs for querying the standardized fields of the index, so applications can search for standard types of data contributed for any of the indexed files.

The present invention also provides a mechanism to keep track of symbolic name associations for every file/entity in the system. Specifically, the present invention provides a session-based and transient shadow table of symbolic names previously used by the files (even beyond the lifetime of the files themselves). By maintaining symbolic name association information beyond the lifetime of the entity itself or its association, the door is opened for other features that can use this information to track referencing entities and validate or even repair them as necessary (even if the referenced entity no longer exists or is no longer associated with the specific symbolic name).

In one aspect of the present invention, a method for indexing a file is provided. The method comprises: registering an index handler corresponding to a particular file type; calling the index handler when a change to a file having the particular file type is detected; parsing the file with the index handler to obtain index information; and writing the index information to an index entry corresponding to the file using an index writer.

In another aspect of the present invention, the method further comprises: passing the index handler the file after the change is detected; and determining that the index handler is capable of parsing the file.

In another aspect of the present invention, the method further comprises: responsive to determining that the index handler is capable of parsing the file, calling the index handler; passing the index handler an index writer object with the file; and the index handler calling the index writer using the index writer object to store the index information.

In another aspect of the present invention, the method further comprises: receiving a query for the file; and searching the index entry based on the query.

In another aspect of the present invention, a system for indexing a file is provided. The system comprises: a handler registration system for registering an index handler corresponding to a particular file type; a change notification system for receiving a notification of a change to a file having the particular file type; a handler interface system for calling the index handler based on the notification, wherein the index handler parses the file to obtain index information; and an index writer that is called by the index handler for writing the index information to an index entry.

In another aspect of the present invention, the handler interface system passes the index handler an index writer object.

In another aspect of the present invention, the system further comprises a query processing system for receiving a query on the file, and for searching the index entry based on the query.

In another aspect of the present invention, the system further comprises an index containing the index entry, wherein the index entry contains a standardized list of fields that contain the file information.

In another aspect of the present invention, a program product stored on at least one computer readable medium for indexing a file is provided. The at least one computer readable medium comprises program code for causing a computer system to perform the following: register an index handler corresponding to a particular file type; call the index handler when a change to a file having the particular file type is detected; parse the file with the index handler to obtain index information; and write the index information to an index entry corresponding to the file using an index writer.

In another aspect of the present invention, the at least one computer readable medium further comprises program code for causing the computer system to perform the following: communicate with the index handler; and pass the index handler the file after the change is detected.

In another aspect of the present invention, the at least one computer readable medium further comprises program code for causing the computer system to perform the following: call the index handler if the index handler is capable of parsing the file; and pass the index handler an index writer object with the file.

In another aspect of the present invention, the at least one computer readable medium further comprises program code for causing the computer system to perform the following: receive a query for the file; and search the index entry based on the query.

In another aspect of the present invention, a method for deploying a system for indexing a file is provided. The system comprises: providing a computer infrastructure being operable to: register an index handler corresponding to a particular file type; call the index handler when a change to a file having the particular file type is detected; parse the file with the index handler to obtain index information; and write the index information to an index entry corresponding to the file using an index writer.

In another aspect of the present invention, a method for maintaining symbolic name integrity in a dynamic environment is provided. The method comprises: detecting a new symbolic name associated with a file; populating a primary table with the association of the new symbolic name to the file; populating a shadow table with an association of a previous symbolic name to the file; and using the shadow table to resolve a dangling reference to the file.

In another aspect of the present invention, the method for maintaining symbolic name integrity in the dynamic environment further comprises using the shadow table to resolve a dangling reference to the file.

In another aspect of the present invention, the method for maintaining symbolic name integrity in the dynamic environment further comprises deleting the association of the previous symbolic name to the file from the shadow table after a predetermined time period.

In another aspect of the present invention, a system for maintaining symbolic name integrity in a dynamic environment is provided. The system comprises: a name detection system for detecting a new symbolic name associated with a file; a table population system for populating a primary table with the association of the new symbolic name to the file, and for populating a shadow table with an association of a previous symbolic name to the file; and a reference resolution system for using the shadow table to resolve a dangling reference to the file.

In another aspect of the present invention, the system for maintaining symbolic name integrity in a dynamic environment further comprises a reference resolution system for using the shadow table to resolve a dangling reference to the file.

In another aspect of the present invention, the table population system further deletes the association of the previous symbolic name to the file from the shadow table after a predetermined time period.

In another aspect of the present invention, a program product stored on at least one computer readable medium for maintaining symbolic name integrity in a dynamic environment is provided. The at least one computer readable medium comprises program code for causing a computer system to perform the following: detect a new symbolic name associated with a file; populate a primary table with the association of the new symbolic name to the file; and populate a shadow table with an association of a previous symbolic name to the file.

In another aspect of the present invention, the at least one computer readable medium further comprising program code for causing the computer system to perform the following: use the shadow table to resolve a dangling reference to the file.

In another aspect of the present invention, the at least one computer readable medium further comprising program code for causing the computer system to perform the following: delete the association of the previous symbolic name to the file from the shadow table after a predetermined time period.

In another aspect of the present invention, a method for deploying a system for maintaining symbolic name integrity in a dynamic environment is provided. The method comprises: providing a computer infrastructure being operable to: detect a new symbolic name associated with a file; populate a primary table with the association of the new symbolic name to the file; and populate a shadow table with an association of a previous symbolic name to the file.

In another aspect of the present invention, the computer infrastructure is further operable to use the shadow table to resolve a dangling reference to the file.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
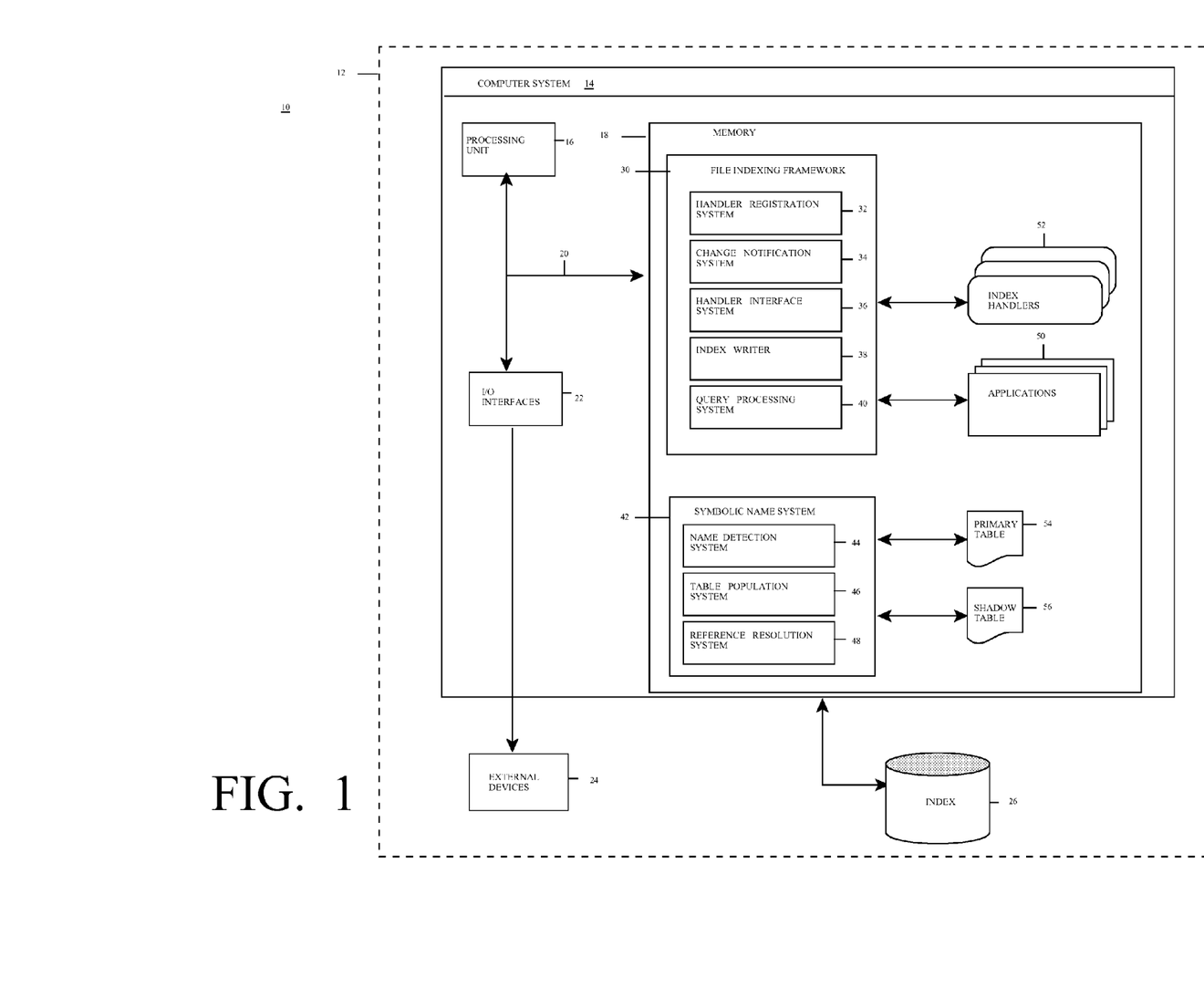
FIG. 1 depicts a file management system according to an aspect of the present invention.

Referring now to FIG. 1, a file management system 10 according to the present invention is shown. As depicted, system 10 includes computer system 14 deployed within a computer infrastructure/environment 12. This is intended to demonstrate, among other things, that some or all of the teachings of the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to manage files according to the present invention.

As shown, computer system 14 includes a processing unit 16, a memory 18, a bus 20, and input/output (I/O) interfaces 22. Further, computer system 14 is shown in communication with external I/O devices/resources 24 and index 26. In general, processing unit 16 executes computer program code, such as applications 50, file indexing framework 30, and symbolic name system 42, which are stored in memory 18. While executing computer program code, processing unit 16 can read and/or write data to/from memory 18, index 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other devices.

Computer infrastructure 12 is only illustrative of various types of computer infrastructures for implementing the invention. For example, in one embodiment, computer infrastructure 12 comprises two or more devices (e.g., a server cluster) that communicate over a network to perform the various process of the invention. Moreover, computer system 14 is only representative of various possible computer systems that can include numerous combinations of hardware. To this extent, in other embodiments, computer system 14 can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or index 26 can comprise any combination of various types of data storage and/or transmission media that reside at one or more physical locations. Further, I/O interfaces 22 can comprise any system for exchanging information with one or more external devices 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or index 26 could be contained within computer system 14, not externally as shown.

Index 26 can be any type of system (e.g., a database) capable of providing storage for file information and/or tables 54 and 56 of symbolic names under the present invention. To this extent, index 26 could include one or more storage devices, such as a magnetic disk drive or an optical disk drive. In another embodiment, index 26 includes data distributed across, for example, a local area network (LAN), wide area network (WAN) or a storage area network (SAN) (not shown). In a typical embodiment, index 26 includes one or more index entries that each correspond to a particular file. Along these lines, each index entry includes a standardized list of fields that contains file information as extracted and indexed under the present invention Shown in memory 18 of computer system 14 (among other systems and tables) are file indexing framework 30, symbolic name system 42, application(s) 50 and index handler(s) 52. It should be understood that file indexing framework 30 and symbolic name system 42 could be provided independent of one another. For example, they do not need to both be provided on a single computer system 14 within the scope of the present invention. In addition, it should be understood that file indexing framework 30 and symbolic name system 42 could be realized as multiple computer programs (as shown), or as a single computer program (not shown). It should also be understood that the various systems and their sub-systems of FIG. 1 are shown as such for illustrative purposes only and that the same functionality could be implemented with a different configuration of systems and sub-systems. In any event, the functions of file indexing framework 30 will be described first in conjunction with FIGS. 1 and 2.

A. File Indexing Framework

As depicted in FIG. 1, file indexing framework 30 includes handler registration system 32, change notification system 34, handler interface system 36, index writer 38, and query processing system 40. Among other things, file indexing framework 30 provides the following capabilities: (1) registration mechanism for index handlers; (2) infrastructure to initialize the contents of the index and update its contents as files are added, changed, and deleted; (3) a delegation mechanism for calling index handlers to parse files they understand for relevant content—this delegation provides the support for indexing arbitrary files with arbitrary formats; (4) establishment of standardized fields in the index entry for a file; (5) a set of index writer APIs to be called by index handlers to store standardized index values for a file; and (6) another set of APIs 60 shown in FIG. 2 (provided as part of query processing system 40) to be called by applications 50 to query the standardized index values. (The term "API" is an acronym for "application programming interface", which enables a computer program to access a set of functions (typically provided by another application or library) without a detailed understanding of the internal workings of the functions being accessed.)

The index handlers are responsible for identifying files they understand, parsing the contents of those files, and identifying appropriate data to be stored in the index entries for those files. Some advantages over a non-extensible file indexing system include: (1) support for new file formats can be added by the provider of the file format, without any changes to the indexing framework or applications querying the index; (2) files storing data formats with built-in extensibility mechanisms, (e.g., WSDL and SCDL) can be indexed without changes to file indexing framework 30, the code that indexes the base elements of the data standard, or applications querying the index (support for a particular extension can be added by the extension provider in the form of an index handler that only processes that extension); and (3) applications 50 can essentially search the contents of arbitrary files with arbitrary formats in a standard manner, by searching standardized fields of index 26, without knowledge of file formats or the runtime extensions for which they may be targeted.

A general description of the file indexing framework 30 will now be given in conjunction with FIG. 1. Thereafter, a more specific illustrative example will be given in FIG. 2. In general, handler registration system 32 allows third parties to register index handlers 52. Each index handler 52 is typically associated with a particular file format. As changes to a file having a particular file format occur, a notification will be received by change notification system 34. Under the present invention such a notification can come directly from applications 50 or from an operating system level. In any event, when such a notification is received, handler interface system 36 will call the associated index handler 52 to determine whether index handler 52 is capable of parsing the affected file. If so, handler interface system 36 will pass index handler 52 the file along with an index writer object. Upon receipt, index handler 52 will parse the file to obtain index information. Such information can be any type of information that will identify the file and its contents. Once the index information is determined/extracted, index handler 52 will call index writer 38 to store the index information. Specifically, index writer 38 will write the index information to an index entry corresponding to the file. As indicated above, each file typically has its own index entry in index 26. Each entry includes a standardized list of fields such as file name and elements defined in the file. Should a user later desire to search/query index 26, the user can submit a query that will be received and processed by query processing system 40. Specifically, query processing system 40 includes a set of query APIs 60 (FIG. 2) that is adapted to receive queries from applications 50.

Figure 2:
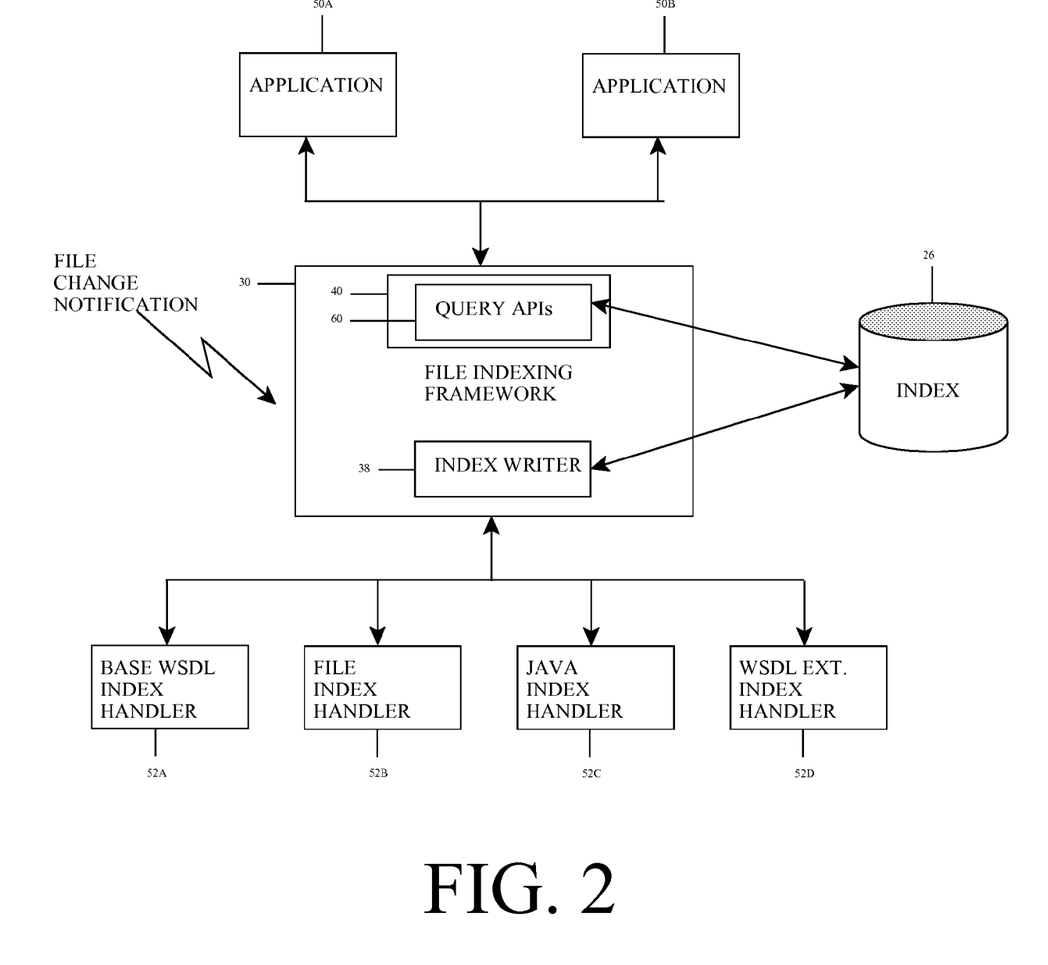
FIG. 2 depicts a more detailed depiction of the file indexing framework of FIG. 1.

Referring now to FIG. 2, a more specific example of these functions is shown. The example shown in FIG. 2 is an indexing and search framework used to implement WebSphere Integration Developer (WID) 6.0., which is commercially available from IBM Corp. of Armonk, N.Y. In general, tooling in WID requires the following information, which can be scattered across all files generated and referenced by WID: (1) all element definitions of a certain type; (2) all files that reference a specified file; (3) all elements that reference a specified element; (4) all elements referenced by a specified element; and (5) all files that define a specified namespace. Implementing these searches without the use of an index 26 is not a viable option from a performance standpoint, because of the potential number of files that would need to be searched. More importantly, WID is based on the Service Component Architecture (SCA) which is highly pluggable. SCA component, import, and export objects—which are saved as files—all contain extensible data that can be defined by a runtime extension. Similarly, the implementation files that each component can reference in its extensible data are also specific to a runtime extension. Correctly indexing new component, import or export types introduced by new runtime extensions would not be possible without an extensible indexing mechanism. The mechanism in this case is file indexing framework 30.

As mentioned above, file indexing framework 30 provides a registration mechanism that allows third parties to define index handlers 52A-D. An index handler 52A-D is responsible for generating index information for a file, and is a class that implements a Java interface provided by file indexing framework 30. An index handler 52A-D is generally specific to a single file type and is provided by the domain owner of the file type. An index handler 52A-D must understand how to parse a file for meaning, to identify elements definitions and references that are relevant to the WID tooling that will be querying index 26.

When creating an index entry for a file, file indexing framework 30 calls each index handler 52A-D, passing it the file being indexed. The index handler 52A-D first determines if it is a file it understands how to parse. If so, it returns true; otherwise it returns false. If index handler 52A-D returns true, file indexing framework 30 calls it again, also passing it an index writer object. Index handler 52A-D should then open the file, parse it, and call index writer 38 with any data that should be stored in the index entry for the file. The index writer class 38 provides convenient methods for storing information in standardized index fields, as well as a method for storing data in handler-specific index fields. Again, index handler 52A-D can return true or false, this time to indicate if data it passed to the index writer 38 should be saved or discarded. File indexing framework 30 calls all handlers 52A-D in the same manner. Index writer 38 manages the merging of data supplied by multiple index handlers 52A-D and stores all of the contributed index fields into an index entry for the file.

By passing all files to all index handlers 52A-D, file indexing framework 30 supports the ability to index arbitrary files with a format understood only by specific index handlers 52A-D, which may be associated with specific runtime extensions. This allows file indexing framework 30 and applications 50 that query index 26 to be independent of the file types being indexed. By allowing multiple index handlers 52A-D to contribute information to an index entry, file indexing framework 30 supports the ability to index file formats that support extensibility. For example, consider WSDL, which has a built-in extensibility mechanism. A basic index handler 52A for WSDL can index the definitions of element types defined as part of the WSDL standard. For example, it can identify all port types defined in a given WSDL file. However, this index handler 52A will not be able to anticipate data type extensions that others may provide, which may appear in any WSDL file. WSDL extensions must instead be indexed by an additional index handler 52D supplied by the providers of those extensions. This additional index handler 52D does not need to index standard WSDL elements, because those will be indexed by the base WSDL index handler 52A. Instead it only needs to contribute index data introduced by its own extensions. File indexing framework 30, through the index writer 38, will merge all index data into the index entry for the file. As a result, the index entry for a WSDL file would contain the index field values contributed by the base WSDL index handler 52A along with those contributed by any index handlers 52D for WSDL extensions.

It should be understood that the exemplary index handlers 52A-D shown in FIG. 2 are depicted for illustrative purposes only. To this extent the present invention could be implemented with any type of technology.

B. Symbolic Names

Figure 3:
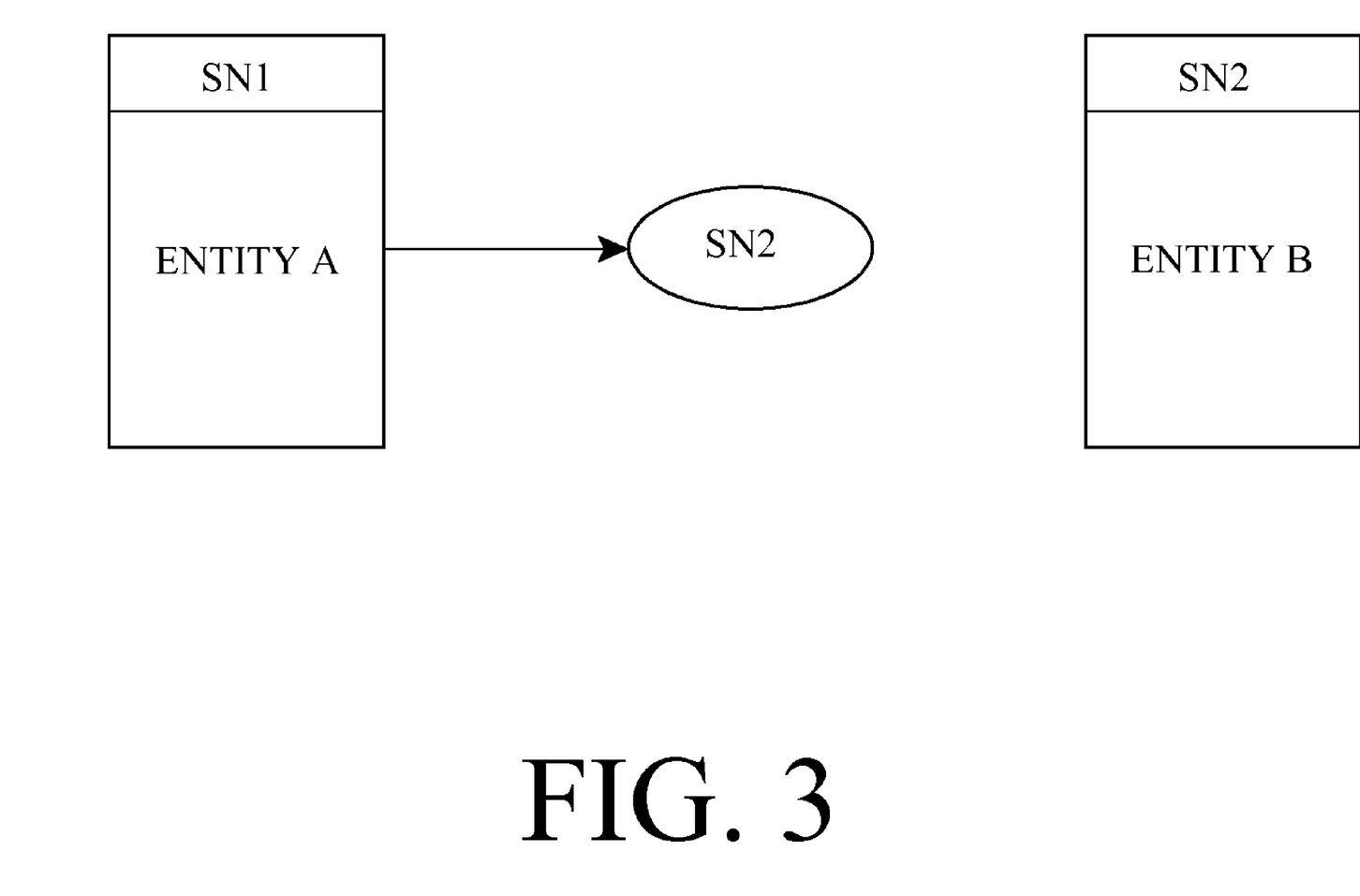
FIG. 3 depicts an illustrative symbolic name scenario according to an aspect of the present invention.

Referring back to FIG. 1, the functions of symbolic name system 42 will be described in greater detail. Specifically, in many systems today: (1) every entity/file is associated with a symbolic name; and (2) entities/files can reference symbolic names (and hence other entities indirectly). This is shown in greater detail in FIG. 3. Specifically, as shown in FIG. 3, entity/file "A" is associated with symbolic name "SN1", while entity/file "B" is associated with symbolic name "SN2". Further, entity "A" references symbolic name "SN2". The following changes can occur in the symbolic name associations of such a system: (1) The symbolic name association of an entity is modified (i.e. the entity is associated with a different symbolic name) (e.g., entity "B" is associated with SN3); and (2) The symbolic name association of an entity is deleted (e.g., the entity such as entity "B", is deleted).

Symbolic name system 42 of FIG. 1 provides a way to deal with such changes in a manner that would allow an advanced response to the changes by the system (e.g. revalidation or re-factoring of affected referencing entities). In general, an aspect of the present invention provides tables 54 and 56 that track symbolic name associations for entities in the system. Specifically, the mechanism of this aspect of the present invention is complemented with an analogous, but transient, shadow table 56 responsible for tracking the previous state of symbolic name associations for entities. To this extent, when a change occurs in a symbolic name association of an entry, the change will be detected by name detection system 44. Upon detection, the association of the entity/file with the new symbolic name will be populated into primary table 54 by table population system 46. Similarly, the old/previous association of the entity/file will be populated into shadow table 56 (e.g., prior to the reflection of the change in the primary table 54). This provides the unique capability of not only looking up what an entity association is, but also what an entity association was prior to the occurrence of the change. This enables various functions that require knowledge of the previous state, such as the ability to find previously referencing entities that now have dangling references, and either validate them to indicate errors or fix them to reference the correct symbolic names. Such lookup and/or resolution functions can be facilitated by reference resolution system 48. In any event, after a predetermined period of time, table population system 46 can update shadow table 56 to remove older associations. This helps control the size of shadow table 56, and helps ensure that stale associations are not maintained.

While shown and described herein as a file management system, it is understood that the invention further provides various alternative embodiments. For example, in one embodiment, the invention provides a computer-readable/useable medium that includes computer program code to enable a computer infrastructure to manage files. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device, such as memory 18 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to remotely manage files. In this case, the service provider can create, maintain, deploy, support, etc., a computer infrastructure, such as computer infrastructure 12 (FIG. 1) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for managing files. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of (1) installing program code on a device, such as computer system 14 (FIG. 1), from a computer-readable medium; (2) adding one or more devices to the computer infrastructure; and (3) incorporating and/or modifying one or more existing systems of the computer infrastructure to enable the computer infrastructure to perform processes according to one or more aspects of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The invention can take the form of an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

For example, the file indexing and symbolic name integrity functions described above could be provided separate and apart from one another, in combination with one another. For example, in the case of the latter, file indexing framework 30 calls index handlers 52 to create an index entry for a file. The index entry can store any kind of information about the file, but one of the standard fields supported by the index writer and index search APIs holds elements that are defined in the file. These elements can be specified in the form of symbolic names. In one embodiment, the file indexing framework 30 is used to support an application 50 that displays data to the user as "logical" artifacts (pieces of data defined in one or more files) rather than as "physical" artifacts (i.e. files). Application 50 can use index queries to resolve a symbolic name to the file it is defined in, as well as resolve a reference to a symbolic name into a file reference. In some cases, it is useful to find and resolve symbolic name references that resolve into references to newly deleted files. However, because file indexing framework 30 removes index entries of deleted files from index 26, it can delete the associations between a deleted file and the symbolic names it defined. Along these lines, the primary table of symbolic names (54 in FIG. 1) is stored in index 26, and the triggering mechanism for updating shadow table 56 can be when the file indexing framework 30 removes entries from index 26.

We claim:

1. A method for indexing a plurality of files, comprising:
registering a plurality of index handlers, each index handler corresponding to a particular file type for a corresponding file;
receiving a notification of a change to a changed file;
calling a registered index handler in response to the notification;
parsing the changed file with the registered index handler to obtain index information for the changed file; and
writing, using an index writer, the index information to an index entry corresponding to the changed file in an index, wherein
the index entry contains a list of fields that contain file information for the changed file in a standardized format regardless of a particular file type of the changed file, and each index handler corresponding to a different file format.

2. The method of claim 1, further comprising:
passing the changed file to the registered index handler after the notification of the change is received; and
determining that the registered index handler is capable of parsing the changed file.

3. The method of claim 2, further comprising:
responsive to the determining that the registered index handler is capable of parsing the changed file, calling the registered index handler;
passing an index writer object with the changed file to the registered index handler; and
calling the index writer, by the registered index handler, using the index writer object to store the index information.

4. The method of claim 1, further comprising:
receiving a query for the changed file; and
searching the index entry based on the query.

5. The method of claim 1, wherein
each index handler is received from a domain owner of the file type.

6. The method of claim 1, further comprising
passing the changed file to each of the plurality of index handlers.

7. A method for indexing a plurality of files, comprising:
registering a plurality of index handlers, each index handler corresponding to a particular file type for a corresponding file;
receiving a notification of a change to a file;
calling a registered index handler in response to the notification;
parsing the file with the registered index handler to obtain index information for the file; and
writing, using an index writer, the index information to an index entry corresponding to the file in an index;
detecting a new symbolic name associated with the file;
populating a primary table with the association of the new symbolic name to the file;
populating a shadow table with an association of a previous symbolic name to the file; and
using the shadow table to resolve a dangling reference to the file, wherein
the index entry contains a list of fields that contain file information for the file in a standardized format regardless of a particular file type of the file.

8. The method of claim 7, further comprising
deleting the association of the previous symbolic name to the file from the shadow table after a predetermined time period.

9. A system for indexing a plurality of files, comprising:
at least one computing device including:
a handler registration system for registering a plurality of index handlers, each index handler corresponding to a particular file type for a corresponding file;
a change notification system for receiving a notification of a change to a changed file;
a handler interface system for calling a registered index handler based on the notification, wherein the registered index handler parses the changed file to obtain index information for the changed file; and
an index writer for writing and storing the index information to an index entry in an index; wherein
the index is a storage database,
the index entry contains a list of fields that contain file information for the changed file in a standardized format regardless of a particular file type of the changed file, and each index handler corresponding to a different file format.

10. The system of claim 9, wherein
the handler interface system passes an index writer object to the index handler.

11. The system of claim 9, wherein
the at least one computing device further including a query processing system for receiving a query on the changed file, and searching the index entry based on the query.

12. The system of claim 9, wherein
each index handler is received from a domain owner of the file type.

13. The system of claim 9, wherein
the handler interface system calls each of the plurality of index handlers based on the notification.

14. A program product stored on at least one computer readable storage medium for indexing a plurality of files, the at least one computer readable storage medium comprising program code for causing a computer system to perform the following:
- register a plurality of index handlers, each index handler corresponding to a particular file type for a corresponding file;
- receive a notification of a change to a changed file;
- call a registered index handler in response to the notification;
- parse the changed file with the registered index handler to obtain index information for the changed file; and
- write and store, using an index writer, the index information to an index entry corresponding to the changed file, in an index; wherein
- the index is a storage database,
- the index entry contains a list of fields that contain file information for the changed file in a standardized format regardless of the particular file type of the changed file, and
- each index handler corresponding to a different file format.

15. The program product of claim 14, wherein the at least one computer readable storage medium further comprising program code for causing the computer system to perform the following:
- communicate with the registered index handler; and
- pass the changed file to the registered index handler after the change is detected.

16. The program product of claim 15, wherein the at least one computer readable storage medium further comprising program code for causing the computer system to perform the following:
- call the registered index handler upon a determination that the registered index handler is capable of parsing the changed file; and
- pass an index writer with the changed file to the registered index handler.

17. The program product of claim 14, wherein the at least one computer readable storage medium further comprising program code for causing the computer system to perform the following:
- receive a query for the changed file; and
- search the index entry based on the query.

18. The program product of claim 14, wherein
- each index handler is received from a domain owner of the file type.

19. The program product of claim 14, wherein the at least one computer readable storage medium further comprising program code for causing the computer system to perform the following:
- passing the changed file to each of the plurality of index handlers.

* * * * *